United States Patent Office 3,146,828
Patented Sept. 1, 1964

3,146,828
METHODS AND COMPOSITIONS FOR
WELL COMPLETION
Robert L. Mann, Ponca City, Okla., assignor to Continental Oil Company, Ponca City, Okla., a corporation of Delaware
No Drawing. Filed Dec. 14, 1960, Ser. No. 75,654
15 Claims. (Cl. 166—12)

This invention relates to well completion methods such as consolidating and fracturing subterranean formations traversed by vertical well bores and compositions for accomplishing these methods. More particularly, this invention is directed to methods of completion and compositions of siliceous cement having the normal attributes of a cement, together with a high degree of permeability upon setting which is achievable at desirable temperatures in a reasonable time.

The drilling of well bores into the formation of subterranean reservoirs for purposes of recovering the fluids contained therein such as oil and gas often entails the necessity of obtaining these fluids from such formations which are incompetent. These formations are often rather incompetent, due to the fact that the particles of the formation are so unconsolidated that the naturally occurring materials within the formation such as sand particles are produced into the well bore to such an extent that production becomes inhibited due to the flow of such materials.

The problem of controlling the undesirable separation and movement of unconsolidated particles during production operations has plagued the industry for a number of years, and there has been no satisfactory resolution of the problem though many attempts have been made to control such production. One approach is exemplified by the number of mechanical devices which have been developed such as screens, filters, liners, chokes, etc., to prevent the production of these undesirable particles; but they have been generally unsatisfactory in inhibiting the flow of such particles.

The other general approach to the problem has been to consolidate the formation with some type of a permeable barrier within the formation, such as the placement of a permeable cement within the formation. Among the permeable cement compositions utilized are those incorporating Portland cement, particularly those using an aggregate and some type of component having natural permeability such as pozzolan, as are those which contain a gas-emitting constituent in the cement to create permeability in otherwise impermeable compositions. The use of silicates, and particularly sodium silicates in combination with an acid treatment and flush is well known to establish cement compositions, but these silicates are normally utilized to establish an impermeable plug or barrier in the subterranean reservoir. Sodium silicate has also been used in conjunction with mechanically coating gravel particles in combination with an acid treatment step, or in conjunction with the natural constituents within the formation to achieve a permeable deposit to obtain the same type of barrier of reduced permeability. It is also a well-known practice to utilize certain plastic compositions of a permeable nature. In actuality there has been no generally accepted solution to the problem of providing a permeable cement structure for use in well completion in a subterranean reservoir.

An object of this invention is to provide a method of forming a consolidating barrier in a portion of a well bore in communication with an incompetent formation adjacent the well bore to prevent the flow of sand particles during production operations.

A further object of this invention is to provide a method of establishing a permeable structure within fractures extended into the formation surrounding the well bore.

A still further object of this invention is to provide a method for applying permeable siliceous cement compositions having the requisite strength, stability, permeability, setting time, and pumpability to be used by the oil industry in fracturing and completion operations.

Another object of this invention is to provide a composition for forming a consolidating barrier in a portion of a well bore in communication with an incompetent subterranean formation with a permeable material which can be mixed at the surface as a conventional cement and injected into the formation for a single phase reaction without an acid flush or the like.

Another object of this invention is to provide a siliceous cement suspension in liquid form which displays high permeability characteristics when set, and formed articles made therefrom.

Other objects and advantages of the present invention will be apparent from the following detailed description and examples of application of the invention.

Stated broadly, the present invention can be defined as a stable suspension of siliceous cement consisting essentially of a sodium silicate, a finely divided solid suspending agent, a siliceous aggregate, water, and a stabilizing agent, said suspension forming a permeable siliceous cement composition upon setting.

In one aspect of the invention, the stable suspension contains an accelerator.

In another aspect, the invention can be defined as a method of completing a subterranean well bore traversing an incompetent formation by placing a stable suspension of siliceous cement in the well bore into and adjacent said formation, consisting of a sodium silicate, a finely divided solid suspending agent, a siliceous aggregate, water, and a stabilizing agent, with an accelerator in some instances, said cement upon setting having the requisites for subterranean usage as set forth below, and formed articles made from said set cement.

The method of completion of the present invention is generally directed to completing wells which traverse subterranean formations for the purpose of producing fluids from said formations and particularly oil and gas wells. The particular completion steps to which the present inventive method is directed are those wherein it is advantageous to place a permeable siliceous cement adjacent to an incompetent formation for the purposes of preventing the production of sand particles concurrently with the fluid production. The method is an appropriate one for use in consolidating an incompetent formation which has been completed open hole at the bottom of the well bore, in casing cement operations wherein cement is pumped down the well bore and behind the casing to hold the casing and formation in place, in instances of squeeze cementing where a previously cemented casing and well bore are subjected to a subsequent deposit of permeable cement in the formation adjacent thereto, in the positioning of liners, and also in fracturing operations.

Subsequent to the preparation of the well bore and surrounding formation for the application of the particular well completion method, such as removing a portion of the sand in the instance of an open hole completion or perforating the casing and cement in those instances where it is necessary, the initial step of the present method is to mix the permeable siliceous cement composition at the surface. This mixing step can be done in any suitable container, normally standard oil field cementing equipment is satisfactory. Upon incorporating the requisite constituents into a stable suspension of siliceous cement, the suspension is then pumped down the well bore to the particular depth and displaced into the formation, whereafter the well bore is closed in for an appropriate period of time preferably in the order of 24 hours in order to allow the permeable siliceous cement to set. Thereafter the well is returned to production, and the formation fluids are extracted without the concurrent production of unconsolidated particles.

The method applied to an open hole completion necessitates the removal of a portion of the unconsolidated formation by conventional means such as underreaming, bailing, etc., whereafter the stable suspension of siliceous cement is displaced into the formation by pumping it down the well bore. After the suspension has set to form a permeable cement, a hole can be drilled in the permeable plug in order to facilitate production.

The application of the present method in an operation to cement casing necessitates that the stable suspension of siliceous cement be pumped down the well bore and upwardly behind the casing contiguous with the formation. After sufficient setting time has elapsed, the casing must then be perforated in order to establish communication between the interior of the well bore and the set permeable cement to produce the formation fluids; or preperforated casing containing plugs can be placed in the well bore with the porforations adjacent the appropriate formation, said porforations being plugged with removable plugging means, such as aluminum or magnesium plugs which can be readily dissolved from the perforations with an acid, to establish the necessary communication between the well bore and the permeable cement adjacent the formation. It is also possible to place merely a limited quantity of this suspension at a selected depth behind the casing by injecting a reduced amount after an initial amount of conventional cement and following it with a further injection of conventional cement to achieve selective placement of the permeable siliceous cement.

In using this method for a squeeze cementing operation of a cased well bore, it is necessary that the casing and casing cement be perforated in a conventional manner prior to the injection of the stable suspension of siliceous cement down the well bore. Also packing means should be placed in the well bore in order that sufficient pressures may be exerted on the suspension to displace it through the perforation against the formation without filling the well bore. It is also possible to incorporate tubing liners having a coating or sheath of the permeable siliceous cement into the tubing string in a conventional manner, thereby avoiding the loose sand production.

The method of the present invention applied in a fracturing operation can be accomplished by injecting an amount of the stable suspension of siliceous cement into the formation subsequent to a conventional fracturing operation, whereby a portion of the fracturing fluid is displaced by the suspension. The suspension can be pumped into the fracture either to the extent that it substantially fills the fracture or to the extent it fills a lesser portion immediately adjacent the well bore, that is, "tailing in" to the fracture for a distance in the order of about 5 to about 20 feet, whereafter the suspension is allowed to set as a permeable siliceous cement to provide a permeable deposit to prop the fracture open for producing the formation fluids without sand from the formation, especially in formations of great depth where sand does not have sufficient strength to perform as a propping agent.

In order to disclose the present invention most fully and comprehensively, it will be advantageous to discuss the requisite characteristics for a permeable consolidating composition which is to be used in subterranean reservoirs. To be satisfactory for such use, a composition must comply with each of the requistes set forth, and failure to do so will render the composition inoperable for use in consolidating incompetent subterranean reservoirs and the formations contained therein. Inability to comply with the inherent requirements within a subterranean reservoir is the reason that no practical method and composition for oil field usage has been developed prior to the present invention.

The initial requste of such a method is to have a pumpable cement composition, and the pumping time of the consolidating composition is set forth most concisely in API Bulletin RP–10B (1959) which in essence is a combination of the setting time and viscosity index correlated to the various depths at which the consolidation is to be made. It is essential that the stable suspension have less than a maximum viscosity as set forth in said Bulletin as the viscosity which will enable the suspension to be discharged into the formation at the requisite depths with the presently available pumping equipment. It has been determined that the pumping time can be met only if the maximum viscosity of the cement is approximately 70 poises or less for lifting and 100 poises or less for pumping. The setting time of the suspension used in the present method must mandatorily be more than the time required for pumping in order to have the suspension in place prior to the occurrence of sufficient setting reaction to cause the viscosity to exceed pump capacities. This will enable the suspension to be lifted by the pumping equipment and displaced into the reservoir prior to the time that the viscosity becomes in excess of the capacities of the pumping equipment, thereby assuring that the suspension can be substantially displaced into or against the formation to prevent setting up in the well bore or equipment.

The criterion of setting time is determined by that period of time necessary to obtain a completion of the bonding reaction in order to establish a cement which will withstand the normal operating conditions. There are many cements which will eventually have a sufficiently complete bonding reaction as to meet the conditions for normal operations, but the period of time is a critical factor. It is obviously important that the suspension should not set up too quickly, or it will result in filling the well bore or perhaps the pumping equipment with this consolidating composition, necessitaing an expensive removal from or abandonment of the operation. Conversely, it is necessary that the setting time not be too extended, because of the expense temporarily ceasing the completion or production operations. It is, therefore, generally accepted that the setting time should never exceed 72 hours, and preferably the setting time should be within 24 hours in order that normal production activities can be resumed without excess expense and delay.

Subsequent to the placement and setting of the cement composition, it is mandatory that the resulting cement have sufficient strength and stability to withstand the pressures and erosive forces of the formation fluids during production activities. The cement should have sufficient stability to chemically withstand the passage of any fluids which may come into contact with it for an extended period of time and not break down to any appreciable extent. The strength of the cement is normally not too stringent a requirement in that it is normally injected in a cementing operation or a fracturing operation where the tensile strength is normally provided for by the adjacent and surrounding formation, but it should have sufficient compressive strength to withstand any pressures which may be exerted upon it during subsequent production operations. Generally, the composition should have at least 100 p.s.i. compressive strength, though it is preferable that it have 500 p.s.i. compressive strength.

The most important requisite of the cement composition of the present invention is permeability, that is, the ability to allow fluid flow within its interconnected pore network. The present invention is directed to a stable suspension of siliceous cement which can be placed in or adjacent to the producing formations, and inability to obtain sufficient fluid conductivity therethrough completely defeats all preceding efforts. It is, therefore, recommended that the cement composition have a permeability of at least 100 millidarcies, and preferably 500 millidarcies or greater.

The filling agent incorporated in the present invention can be any siliceous aggregate which is a solid siliceous material having the requisite particle size distribution, preferably a sand. It is not intended that the aggregate must necessarily have a particular configuration, though irregular particles with random arrangement provide greater permeability than spherical particles. The particle size is critical to the extent that a narrow range, within the broader range specified below, of particle size distribution increases the permeability of the cement, and conversely a broader range of particle sizes diminishes the permeability. Particle size is critical to the extent that a complete range of particle sizes less than the minimum aggregate size must be removed from the aggregate for purposes of providing maximum permeability. The aggregate should have an optimum particle size in the range from about 20 to about 100 mesh (0.84–0.149 mm.) all sieve sizes being U.S. Series, and an amount in the range from about 40 to about 80 parts by weight of the suspension, preferably about 50 to 70 parts by weight thereof.

There is also included an inert solid suspending agent for the purposes of holding the filling agent in suspension while the components are in the form of a stable suspension prior to actual completion of the setting process. Substantially any inert material such as silica flour, ground mica, diatomaceous earth, and the like, which has the requisite particle size, that is, a finely divided solid capable of forming a stable suspension in the presence of the other components, preferably less than 200 mesh (0.074 mm.), will be satisfactory as the suspending agent. This component is included in the composition in amount from about 2 to about 25 parts by weight of the total suspension preferably from 6–15 parts by weight, the parts required varying greatly in accordance with the specific gravity of the individual agent. The inertness is that property which precludes the agent from releasing an ion which will appreciable effect the setting time of the suspension, that is act to accelerate or decelerate the reaction.

The bonding agent of the cement composition for the present inventive method is sodium silicate ($Na_2O:SiO_2$), preferably in the powder form, which must have a ratio of sodium oxide ($Na_2O$) to silicon dioxide ($SiO_2$) that enables the silicate to be substantially water-soluble. These ratios are generally in the range from about 1:2 parts sodium oxide to silicon dioxide to about 1:3 parts sodium oxide to silicon dioxide, but the preferred ranges are from about 1:2.2 parts sodium oxide to silicon dioxide to about 1:2.8 parts sodium oxide to silicon dioxide. An increase in the proportion of sodium oxide in the silicate increases the alkalinity and the pH factor which reduces the speed of the bonding reaction thereby slowing the setting time. Accordingly the converse of the foregoing holds, so it is possible by varying these ratios to control the setting time requirements to a certain extent. This is particularly advantageous when a large amount of the cement composition is to be deposited within the confines of a single form or containing means. The amount of sodium silicate included in the cement composition in terms of percentage by dry weight of the total suspension is in the range from about 5 parts to about 20 parts, and preferably in the range from about 10 parts to about 15 parts. A sodium silicate having proportionate parts in the above range and in the foregoing amounts sets at temperatures in excess of about 175° F. and at all temperatures greater, normally within a 24-hour period. It is desirable that sodium silicate in the dry powder form be utilized because of the ease of handling and the convenience of pre-packaging with all of the other components which are dry, except water, so that the addition of water for mixing is the only step necessary in using the present permeable cement. This is not critical, however, and the silicate can be used in liquid solution with water, however, this water should be considered as a portion of the requisite water as set forth hereinbelow.

The degree of alkalinity of the silicate is inversely proportional to the ratio of $Na_2O$ to $SiO_2$, with 1:1 being extremely alkaline. Lower *alkalinity* silicates are less soluble in water and, therefore, have a faster setting time because of the rapidity with which colloidal silicic acid is precipitated. The converse applies for higher alkalinity silicates. Viscosity of the system is affected in a proportional manner to the solubility of the silicate. The more *alkaline* silicates are more soluble, less viscous, and, therefore, require increased setting time because of the necessity of coming out of solution to form the silicic acid bond. An increase in the alkalinity of the system increases the pumping time of the system. The amount of sodium silicate should be in the range from about 5 to about 20 parts by weight of the total suspension and have a particle size which will enable it to go into solution with the water readily.

The carrier for the aforementioned constituents of the stable suspension of siliceous cement is water, and it functions as the suspending vehicle for the sand, and as the solvent for the sodium silicate, to facilitate the bonding of the composition during the setting period. Substantially any potable water can be used, and the amount of water to be included should be from about 5 to about 20 parts by weight of the total suspension, preferably 12 to 17 parts by weight.

The present invention uses a stabilizing agent to achieve water resistance of the set cement. Any of a variety of such agents may be used. One that is preferred is zinc oxide ($ZnO$), which is incorporated in the composition as a stabilizing agent to make it stable in the presence of water, that is, capable of resisting any erosive action by water. The particle size is not too critical, though it should be similar to that of the suspending agent, that is, less than about 200 mesh (0.074 mm.). The amount should be in the range from about 0.5 to about 2 parts by weight of the suspension, and the addition of larger amounts though possible, is without appreciable benefit because the system can incorporate only a limited amount as a stabilizing agent.

The following examples (Tables I and II) illustrate examples of the composition which are operable in subterranean formations wherein the temperatures are in excess of 175° F. Table I indicates the components of the composition which were mixed in the dry state in the indicated amounts and then blended with the water to form a slurry. Thereafter the slurried compositions were tested for pumpability in accordance with API Bulletin RP–10B, and the compositions were then placed in suitable containers which were immersed in a heated water bath wherein the temperature is controlled at the desired temperature for the specified period of time. After the elapse of the indicated setting period, the compositions were removed and conventional testing procedures were applied to establish the strength and permeability of the compositions. The compositions were then subjected to the indicated procedures to determine the existence of the required stability. The results of these testing procedures are included in Table II below.

TABLE I

| Sample No. | Ratio of $Na_2O:SiO_2$ | Parts by weight | | | | |
|---|---|---|---|---|---|---|
| | | Aggregate | Suspending agent | Stabilizing agent | Water | Sodium silicate |
| 1 | 1:2.61 | 49.5 | 16.5 | 1.0 | 16.5 | 16.5 |
| 2 | 1:2.28 | 68.4 | 0.0 | 1.3 | 15.4 | 14.8 |
| 3 | 1:3.22 | 52.7 | 9.7 | 1.0 | 19.1 | 17.5 |
| 4 | 1:2.00 | 57.6 | 15.4 | 1.1 | 13.4 | 12.5 |
| 5 | 1:3.22 | 59.4 | 11.3 | 0.4 | 15.6 | 13.3 |
| 6 | 1:3.22 | 59.0 | 11.2 | 1.1 | 15.5 | 13.2 |
| 7 | 1:2.28 | 61.2 | 10.2 | 1.1 | 14.3 | 13.2 |
| 8 | 1:2.28 | 61.2 | 10.2 | 1.1 | 14.3 | 13.2 |
| 9 | 1:2.41 | 59.1 | 13.8 | 1.5 | 13.8 | 11.8 |
| 10 | 1:2.41 | 59.1 | 13.8 | 1.5 | 13.8 | 11.8 |
| 11 | 1:2.41 | 58.0 | 13.5 | 1.4 | 15.5 | 11.6 |
| 12 | 1:2.61 | 59.1 | 13.8 | 1.5 | 13.8 | 11.8 |
| 13 | 1:2.61 | 59.1 | 13.8 | 1.5 | 13.8 | 11.8 |
| 14 | 1:2.61 | 58.4 | 7.8 | 1.0 | 17.1 | 15.6 |
| 15 | 1:2.51 | 59.1 | 13.8 | 1.5 | 13.8 | 11.8 |
| 16 | 1:2.61 | 61.2 | 14.4 | 1.4 | 14.4 | 8.2 | is desirable to increase the speed of setting, that is, an accelerator.

The accelerators for the present inventive cement comosition are those which accelerate, to a limited extent, the rate at which my cement sets, particularly compounds which release carbon dioxide at a slow rate, such as ammonium bicarbonate, sodium bicarbonate, and other bicarbonate salts. Among the foregoing ammonium bicarbonates in an amount less than one part by weight of the suspension is the preferred accelerator, because the release of carbon dioxide therefrom is relatively slow, and there is no problem of flash-setting the composition. Also the ammonium bicarbonate reacts at a lower temperature, and the products of the reaction are either water or gases which do not appreciably alter the characteristics of the suspension. The carbon dioxide decreases the alkalinity of the composition, thereby reducing the solubility of the silicate in water and increasing the viscosity while the increased rate of precipitation for the colloidal silicic acid reduces the setting temperature and time.

The following examples (Tables III and IV) illustrate suspensions which are operable in subterranean formations wherein the temperatures are in excess of 140° F.,

TABLE II

| Sample No. | API RP-10B squeeze schedule in hr.:min. at depths in feet | | | | | Setting time in hours at 3,000 p.s.i. and temp., °F. | Compressive p.s.i. strength | Permeability, millidarcies | Stability | Remarks |
|---|---|---|---|---|---|---|---|---|---|---|
| | 16,000 | 14,000 | 12,000 | 10,000 | 8,000 | | | | | |
| 1 | | | | >2:22 | | >2:55 | 24/200 | No set | | | Temp. cond. |
| 2 | | | | | | None | 24/200 | | | | Unpumpable. |
| 3 | | | | | | 0:11 | Set immediately. | | | | No pumping time. |
| 4 | | | | >2:01 | | | 24/200 | No set | | | Too alkaline. |
| 5 | | | | | | | 24/200 | Yes, set hard | | Dissolved in water. | Unstable. |
| 6 | | | | | | | 24/200 | Yes, set hard | 300 | Yes | Unpumpable. |
| 7 | 1:17 | >2:26 | >2:42 | | | | 48/170 | 1,546 | 1,200 | Yes | Operable. |
| 8 | 1:17 | >2:26 | >2:42 | | | | 24/200 | 1,220 | 3,000 | Yes | Do. |
| 9 | | >2:26 | >2:28 | >2:10 | | | 24/170 | 936 | 1,500 | Yes | Do. |
| 10 | | >2:26 | >2:28 | >2:10 | | | 24/200 | 956 | 3,000 | Yes | Do. |
| 11 | | | | | >2:43 | | 24/190 | Yes, set hard | 500 | Yes | Do. |
| 12 | | | | | >2:40 | | 64/170 | Yes, set hard | 700 | Yes | Do. |
| 14 | | | | | >2:40 | | 24/200 | Yes, set hard | 600 | Yes | Do. |
| 14 | | | >1:33 | | >1:55 | | 24/200 | Yes, set hard | 5,000 | Yes | Do. |
| 15 | | | | >3:42 | | | 48/160 | Yes, set fairly hard. | Yes | Yes | Do. |
| 16 | | | | >2:48 | | | 24/170 | Yes, set hard | 1,610 | Yes | Do. |

As stated, the specific cement compositions for use in the individual formations are determined by the formation characteristics, the most significant characteristic being the depth at which the composition is to be deposited. The depth defines the time required to pump the suspension into the formation, and the requisite viscosity is readily determinable from API Bulletin RP-10B. This viscosity factor can be altered by varying the amount of water, sand, or suspending agent, so can be controlled in several ways to achieve the requisite pumping time.

Further, and of most criticality, the depth determines the temperature of the conditions under which the bonding reaction must occur. Generally, any bonding reactions will proceed to completion at elevated temperatures, such as 250° F. or greater, but the present invention is constituted in such a manner as to allow setting at temperatures in the order of about 175° F. The significance of this is that the stable suspension will set at depths of about 8,000 feet rather than being workable only at lower levels of about 15,000 feet where the normal temperature gradient is about 175° F. and 250° F., respectively. There is also an added reactant which can be incorporated in the suspension in those instances where it but less than 180° F. Table III indicates the relative amounts of the components of this invention wherein the preferred accelerator is included. The suspension is formed in the manner described above and tested in accordance with the same procedures, the results of which are set forth in Table IV below.

TABLE III

| Sample No. | Ratio of $Na_2O:SiO_2$ | Parts by weight | | | | | |
|---|---|---|---|---|---|---|---|
| | | Aggregate | Suspending agent | Stabilizing agent | Water | Sodium silicate | Accelerator |
| 1 | 1:2.41 | 60 | 14 | 1.5 | 16.0 | 12.0 | 1.1 |
| 2 | 1:2.41 | 60 | 14 | 1.5 | 16.0 | 12.0 | 0.1 |
| 3 | 1:2.41 | 60 | 14 | 1.5 | 16.0 | 12.0 | 0.2 |
| 4 | 1:2.41 | 60 | 14 | 1.5 | 16.0 | 12.0 | 0.4 |
| 5 | 1:2.41 | 60 | 14 | 1.5 | 16.0 | 12.0 | 0.5 |
| 6 | 1:2.41 | 60 | 14 | 1.5 | 15.0 | 12.0 | 0.2 |
| 7 | 1:2.41 | 60 | 14 | 1.5 | 15.0 | 12.0 | 0.3 |

TABLE IV

| Sample No. | API RP-10B squeeze schedule in hr:min at depths in feet | | | Setting time in hours at 3,000 p.s.i. and temp., °F. | Compressive p.s.i. strength | Permeability, millidarcies | Stability | Remarks |
| --- | --- | --- | --- | --- | --- | --- | --- | --- |
| | 10,000 | 8,000 | 6,000 | | | | | |
| 1 | 0:10 | | | | | | | Insufficient pumping time. |
| 2 | >3:30 | | | 48/140 | No set | | | Slight acceleration. |
| 3 | | | >3:23 | 24/160 | Yes, set hard. | Good | Yes | Operable. |
| 4 | | 3:31 | >3:10 | 66/140 | ____do____ | 2,000 | Yes | Do. |
| 5 | | | 1:56 | 24/140 | ____do____ | Good | Yes | Do. |
| 6 | | >2:50 | | 24/177 | ____do____ | 2,000 | Yes | Do. |
| 7 | | >3:08 | | 24/177 | ____do____ | 1,000 | Yes | Do. |

In order that the present invention may be more fully understood, the following examples are included by way of illustration and by no means should be construed as limiting the scope of the present invention.

Example 1

An oil producing well in the Tepetate Field located in the Acadia Parish of Louisiana was subjected to a well completion method of the present invention. The well had a cased well bore effectively extending to a depth of approximately 8,600 feet, and the well completion was applied to the Ortego A sand formation located between 8,290 and 8,300 feet, where the temperature was 172° F. This formation is an unconsolidated type known to produce undesirable amounts of sand particles in conjunction with oil production, thereby making it advantageous to squeeze cement into the formation in accordance with the method disclosed herein.

The casing and cement were perforated by conventional means at a depth of 8,294–8,296 feet, and the conventional downhole equipment was positioned in the well bore. A stable suspension of siliceous cement in an amount of 10 barrels was prepared, said suspension was comprised of 58.4 parts sand having a particle size from 20–100 mesh, 11.7 parts powdered sodium silicate having a 1:2.41 ratio of sodium oxide to silicon dioxide, 13.6 parts silica flour having a particle size less than 200 mesh, 1.5 parts zinc oxide having particle size less than 200 mesh, 14.6 parts of water, and 0.26 part of ammonium bicarbonate. The suspension was pumped down the well bore adjacent the perforated portion of the well bore and squeezed from the well bore into the annular space adjacent the casing cement and in contact with the formation without difficulty. The well was closed in under pressure for 15 hours, whereafter the pressure was released, and samples of the permeable siliceous cement composition were withdrawn for examination. The cement composition was completely set and had a strength of approximately 1,250 p.s.i. compressive strength, substantially infinite stability and a permeability of 2,000 millidarcies. Subsequent to the application of this method there has been substantially no production of unconsolidated formation particles from the treated formation.

Example 2

An oil producing well in a producing field suitable to be subjected to a well completion method of the present invention would have a cased well bore extending to a depth of approximately 12,580 feet. The unconsolidated formation extending from a depth from 12,550 to 12,575 feet could be completed by perforating the casing and adjacent formation and fracturing the formation in a conventional manner at depth of 12,570 to 12,572 feet wherein the temperature is 192° F. The method of well completion of tailing-in to the fracture as taught in this application would be appropriate to prevent the production of unconsolidated particles from the fractured formation.

Subsequent to the fracturing 40 barrels of a stable suspension of siliceous cement would be prepared with the suspension comprising 60 parts sand having a particle size from 20–100 mesh, 13 parts powdered sodium silicate having a 1:2.3 ratio of sodium oxide to silicon dioxide, 11 parts silica flour having a particle size range less than 200 mesh, 1.5 parts zinc oxide having a particle size less than 200 mesh, and 14 parts of water. Thereafter pumping this suspension for a distance of ten feet into the fractured portion of the formation adjacent the well bore, closing the well in for about 24 hours would have provided a permeable siliceous cement having a compressive strength of about 1,200 p.s.i., substantially infinite stability, and a permeability in the order of 1,000 millidarcies to support the fracture and provide a permeable barrier to prevent the production of unconsolidated particles during the subsequent oil production.

The cement compositions of the present invention are particularly described as being appropriately used in subterranean locations, but it is not intended that their use should be so limited as to preclude the utilization of them in other applications, particularly those other than subterranean. These cement compositions can be used in those surface locations where it is desirable to have a permeable siliceous cement of the particular nature described herein, such as in filter beds, linears for cyclones, and the like.

While particular embodiments of the invetion have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A method of completing a well bore traversing an incompetent subterranean formation which comprises pumping a stable suspension of siliceous cement into said well bore, said suspension consisting esentially of: a siliceous aggregate having particle size from about 20 to about 100 mesh in an amount from 40 to 80 parts by weight of said suspension; a sodium silicate having a ratio of sodium oxide to silicon dioxide from 1:2 to 1:3 in an amount from 5 to 20 parts by weight of said suspension; a finely divided solid suspending agent having particle size less than about 200 mesh in an amount from 2 to 25 parts by weight of said suspension; a stabilizing agent in an amount sufficient to render the set composition stable to fluids of said formation; and water in an amount from 5 to 20 parts by weight of said suspension, displacing said suspension into contact with said formation, closing in said well bore for a period of time to allow the setting of said suspension whereby a permeable siliceous cement composition is formed, and producing the fluids of said formation through said composition.

2. A method of completing a well bore traversing an incompetent subterranean formation which comprises pumping a stable suspension of siliceous cement into said well bore, said suspension consisting essentially of: a siliceous aggregate having particle size from about 20 to about 100 mesh in an amount from 50 to 70 parts by weight of said suspension; a sodium silicate having a ratio of sodium oxide to silicon dioxide from 1:2.2 to 1:2.8 in an amount from 10 to 15 parts by weight of said suspension; a finely divided solid suspending agent having particle size less than about 200 mesh in an amount from 6 to 15 parts by weight of said suspension; a stabilizing agent in an amount sufficient to render the set composition stable to fluids of said formation; and water in an amount from 12 to 17 parts by weight of said suspension, displacing said suspension into contact with said formation, closing in said well bore for a period of time to allow the setting of said suspension whereby a permeable siliceous cement composition is formed, and producing the fluids of said formation through said composition.

3. A method of completing a well bore containing uncemented casing and traversing an incompetent subterranean formation which comprises pumping a stable suspension of siliceous cement into the annular space between the casing and the well bore and into contact with said casing and well bore, said suspension consisting essentially of: a siliceous aggregate having particle size from about 20 to about 100 mesh in an amount from 40 to 80 parts by weight of said suspension; a sodium silicate having a ratio of sodium oxide to silicon dioxide from 1:2 to 1:3 in an amount from 5 to 20 parts by weight of said suspension; a finely divided solid suspending agent having particle size less than about 200 mesh in an amount from 2 to 25 parts by weight of said suspension; a stabilizing agent having particle size less than about 200 mesh in an amount from 0.5 to 2 parts by weight of said suspension; and water in an amount from 5 to 20 parts by weight of said composition, closing in said well for a period of time to allow the setting of said suspension whereby a permeable siliceous cement composition is formed, perforating the casing within said well bore adjacent said formation, and producing the fluids of said formation through said composition.

4. A method of completing a well bore traversing an incompetent subterranean formation which comprises emplacing casing having pre-perforated sections with removable plugging means in the perforations thereof into said well bore, said sections being located adjacent said formation, pumping a stable suspension of siliceous cement into the annular space between the casing and the well bore and into contact with said casing and well bore, said suspension consisting essentially of: a siliceous aggregate having particle size from about 20 to about 100 mesh in an amount from 40 to 80 parts by weight of said suspension; a sodium silicate having a ratio of sodium oxide to silicon dioxide from 1:2 to 1:3 in an amount from 5 to 20 parts by weight of said suspension; a finely divided solid suspending agent having particle size less than about 200 mesh in an amount from 2 to 25 parts by weight of said suspension; a stabilizing agent having particle size less than about 200 mesh in an amount from 0.5 to 2 parts by weight of said suspension; and water in an amount from 5 to 20 parts by weight of said composition, closing in said well for a period of time to allow the setting of said suspension whereby a permeable siliceous cement composition is formed, removing the plugging means from the perforations of said casing, and producing the fluids of said formation through said composition.

5. A method of completing an open hole well bore traversing an incompetent subterranean formation which comprises removing a portion of said formation, displacing a stable suspension of siliceous cement into said well bore in contact with said formation, said suspension consisting essentially of: a siliceous aggregate having particle size from about 20 to about 100 mesh in an amount from 40 to 80 parts by weight of said suspension; a sodium silicate having a ratio of sodium oxide to silicon dioxide from 1:2 to 1:3 in an amount from 5 to 20 parts by weight of said suspension; a finely divided solid suspending agent having particle size less than about 200 mesh in an amount from 2 to 25 parts by weight of said suspension; a stabilizing agent having particle size less than about 200 mesh in an amount from 0.5 to 2 parts by weight of said suspension; and water in an amount from 5 to 20 parts by weight of said suspension, closing in said well bore for a period of time to allow the setting of said suspension whereby a permeable siliceous cement composition is formed, drilling out a portion of said composition, and producing the fluids of said formation through said composition.

6. A method of completing a well bore containing uncemented casing and traversing an incompetent subterranean formation which comprises pumping a conventional oil well cement into the annular space between the casing and the well bore and into contact with that portion of said casing and well bore above said formation, pumping a stable suspension of siliceous cement into the annular space between the casing and the well bore and into contact with that portion of said casing and well bore adjacent said formation, said suspension consisting essentially of: a siliceous aggregate having particle size from about 20 to about 100 mesh in an amount from 40 to 80 parts by weight of said suspension; a sodium silicate having a ratio of sodium oxide to silicon dioxide from 1:2 to 1:3 in an amount from 5 to 20 parts by weight of said suspension; a finely divided solid suspending agent having particle size less than about 200 mesh in an amount from 2 to 25 parts by weight of said suspension; a stabilizing agent having particle size less than about 200 mesh in an amount from 0.5 to 2 parts by weight of said suspension; and water in an amount from 5 to 20 parts by weight of said composition, pumping a conventional oil well cement into the annular space between the casing and the well bore and into contact with that portion of said casing and well bore below said formation, closing in said well bore for a period of time to allow the setting of said suspension whereby a permeable siliceous cement composition is formed adjacent said formation, perforating the casing within said well bore adjacent said formation, and producing the fluids of said formation through said composition.

7. A method of completing a cased well bore traversing an incompetent subterranean formation which comprises perforating the casing and cement adjacent said formation, inserting packing means within said well bore adjacent the perforation to isolate a portion of said well bore, pumping a stable suspension of siliceous cement into the isolated portion of said well bore, said suspension consisting essentially of: a siliceous aggregate having particle size from about 20 to about 100 mesh in an amount from 40 to 80 parts by weight of said suspension; a sodium silicate having a ratio of sodium oxide to silicon dioxide from 1:2 to 1:3 in an amount from 5 to 20 parts by weight of said suspension; a finely divided solid suspending agent having particle size less than about 200 mesh in an amount from 2 to 25 parts by weight of said suspension; a stabilizing agent having particle size less than about 200 mesh in an amount from 0.5 to 2 parts by weight of said suspension; and water in an amount from 5 to 20 parts by weight of said suspension, squeezing said suspension into said formation, closing in said well bore for a period of time to allow the setting of said suspension whereby a permeable siliceous cement composition is formed, and producing the fluids of said formation through said composition.

8. A method of completing a cased well bore traversing an incompetent subterranean formation which comprises perforating the casing and cement adjacent said formation, inserting packing means within said well bore adjacent the perforation to isolate a portion of said well bore, fracturing said formation, pumping a stable suspension of siliceous cement into substantially all of the fracture within said formation, said suspension consisting essentially of: a siliceous aggregate having particle size from about 20 to about 100 mesh in an amount from 40 to 80 parts by weight of said suspension; a sodium silicate having a ratio of sodium oxide to silicon dioxide from 1:2 to 1:3 in an amount from 5 to 20 parts by weight of said suspension; a finely divided solid suspending agent having particle size less than about 200 mesh in an amount from 2 to 25 parts by weight of said suspension; a stabilizing agent having particle size less than about 200 mesh in an amount from 0.5 to 2 parts by weight of said suspension; and water in an amount from 5 to 20 parts by weight of said suspension, closing in said well bore for a period of time to allow the setting of said suspension whereby a permeable siliceous cement composition is formed to prop said fracture open, and producing the fluids of said formation through said composition.

9. A method of completing a cased well bore traversing an incompetent subterranean formation which comprises perforating the casing and cement adjacent said formation, inserting packing means within said well bore adjacent the perforation to isolate a portion of said well bore, fracturing said formation, pumping a stable suspension of siliceous cement into a portion of the fracture within said formation adjacent said well bore, said suspension consisting essentially of: a siliceous aggregate having particle size from about 20 to about 100 mesh in an amount from 40 to 80 parts by weight of said suspension; a sodium silicate having a ratio of sodium oxide to silicon dioxide from 1:2 to 1:3 in an amount from 5 to 20 parts by weight of said suspension; a finely divided solid suspending agent having particle size less than about 200 mesh in an amount from 2 to 25 parts by weight of said suspension; a stabilizing agent having particle size less than about 200 mesh in an amount from 0.5 to 2 parts by weight of said suspension; and water in an amount from 5 to 20 parts by weight of said suspension, closing in said well bore for a period of time to allow the setting of said suspension whereby a permeable siliceous cement composition is formed to prop said fracture open, and producing the fluids of said formation through said composition.

10. A stable suspension of siliceous cement consisting essentially of: a siliceous aggregate having particle size from about 20 to about 100 mesh in an amount from 40 to 80 parts by weight of said suspension; a sodium silicate having a ratio of sodium oxide to silicon dioxide from 1:2 to 1:3 in an amount from 5 to 20 parts by weight of said suspension; a finely divided solid suspending agent having particle size less than about 200 mesh in an amount from 2 to 25 parts by weight of said suspension; a stabilizing agent in an amount sufficient to render the set composition stable to the fluids of said formation; and water in an amount from 5 to 20 parts by weight of said suspension, said suspension forming a permeable siliceous cement composition upon setting.

11. A stable suspension of siliceous cement consisting essentially of: a siliceous aggregate having particle size from about 20 to about 100 mesh in an amount from 50 to 70 parts by weight of said suspension; a sodium silicate having a ratio of sodium oxide to silicon dioxide from 1:2.2 to 1:2.8 in an amount from 10 to 15 parts by weight of said suspension; a finely divided solid suspending agent having particle size less than about 200 mesh in an amount from 6 to 15 parts by weight of said suspension; a stabilizing agent having particle size less than about 200 mesh in an amount from 0.5 to 2 parts by weight of said suspension; and water in an amount from 12 to 17 parts by weight of said suspension, said suspension forming a permeable siliceous cement composition upon setting.

12. A stable suspension of siliceous cement comprising 60 parts by weight of a sand having a particle size from 20 to 100 mesh, 13 parts by weight of a sodium silicate having a ratio of 1:2.27 of sodium oxide to silicon dioxide, 10 parts by weight of silica flour having a particle size range less than 200 mesh, 1 part by weight of zinc oxide, having a particle size range less than 200 mesh, and 15 parts by weight of water, said suspension forming a permeable siliceous cement composition upon setting.

13. A stable suspension of siliceous cement comprising 58 parts by weight of a sand having a particle size from 20 to 100 mesh, 15.5 parts by weight of a sodium silicate having a ratio of 1:2.6 of sodium oxide to silicon dioxide, 7.8 parts by weight of silica flour having a particle size range less than 200 mesh, 1 part by weight of zinc oxide having a particle size range less than 200 mesh, and 17.5 parts by weight of water, said suspension forming a permeable siliceous cement composition upon setting.

14. A stable suspension of siliceous cement consisting essentially of: a siliceous aggregate having particle size from about 20 to about 100 mesh in an amount from 40 to 80 parts by weight of said suspension; a sodium silicate having a ratio of sodium oxide to silicon dioxide from 1:2 to 1:3 in an amount from 5 to 20 parts by weight of said suspension; a finely divided solid suspending agent having particle size less than about 200 mesh in an amount from 2 to 25 parts by weight of said suspension; a stabilizing agent having particle size less than about 200 mesh in an amount from 0.5 to 2 parts by weight of said suspension; water in an amount from 5 to 20 parts by weight of said suspension, and an accelerator in an amount less than one part by weight of said suspension, said suspension forming a permeable siliceous cement composition upon setting.

15. A stable suspension of siliceous cement consisting essentially of: a siliceous aggregate having particle size from about 20 to about 100 mesh in an amount from 40 to 80 parts by weight of said suspension; a sodium silicate having a ratio of sodium oxide to silicon dioxide from 1:2 to 1:3 in an amount from 5 to 20 parts by weight of said suspension; a finely divided solid suspending agent having particle size less than about 200 mesh in an amount from 2 to 25 parts by weight of said suspension; a stabilizing agent having particle size less than about 200 mesh in an amount from 0.5 to 2 parts by weight of said suspension; water in an amount from 5 to 20 parts by weight of said suspension; and ammonium bicarbonate in an amount of 0.25 part by weight of said suspension, said suspension forming a permeable siliceous cement composition upon setting.

References Cited in the file of this patent

UNITED STATES PATENTS

| | | |
|---|---|---|
| 1,896,212 | Woods | Feb. 7, 1933 |
| 1,983,498 | Lux | Dec. 4, 1934 |
| 2,536,871 | Carlton | Jan. 2, 1951 |
| 2,786,531 | Mangold et al. | Mar. 26, 1957 |
| 2,809,118 | Keil | Oct. 8, 1957 |
| 2,914,413 | Mercer | Nov. 24, 1959 |